US008589151B2

(12) United States Patent
Chamberlain

(10) Patent No.: US 8,589,151 B2
(45) Date of Patent: Nov. 19, 2013

(54) VOCODER AND ASSOCIATED METHOD THAT TRANSCODES BETWEEN MIXED EXCITATION LINEAR PREDICTION (MELP) VOCODERS WITH DIFFERENT SPEECH FRAME RATES

(75) Inventor: Mark W. Chamberlain, Honeoye Falls, NY (US)

(73) Assignee: Harris Corporation, Melbourne, FL (US)

( * ) Notice: Subject to any disclaimer, the term of this patent is extended or adjusted under 35 U.S.C. 154(b) by 1331 days.

(21) Appl. No.: 11/425,437

(22) Filed: Jun. 21, 2006

(65) Prior Publication Data

US 2007/0299659 A1 Dec. 27, 2007

(51) Int. Cl.

| | |
|---|---|
| ***G10L 19/04*** | (2013.01) |
| ***G01L 19/00*** | (2006.01) |
| ***G01L 19/02*** | (2006.01) |
| ***G10L 21/00*** | (2013.01) |

(52) U.S. Cl.
USPC ............ 704/219; 704/228; 704/229; 704/230

(58) Field of Classification Search
USPC ......................................................... 704/219
See application file for complete search history.

(56) References Cited

U.S. PATENT DOCUMENTS

| | | | | |
|---|---|---|---|---|
| 5,729,655 | A * | 3/1998 | Kolesnik et al. | 704/223 |
| 5,987,506 | A * | 11/1999 | Carter et al. | 709/213 |
| 6,453,287 | B1 * | 9/2002 | Unno et al. | 704/219 |
| 6,581,032 | B1 * | 6/2003 | Gao et al. | 704/222 |
| 6,678,654 | B2 | 1/2004 | Zinser, Jr. et al. | 704/221 |
| 6,691,082 | B1 | 2/2004 | Aguilar et al. | 704/219 |
| 6,829,579 | B2 * | 12/2004 | Jabri et al. | 704/221 |
| 6,917,914 | B2 * | 7/2005 | Chamberlain | 704/219 |
| 7,272,556 | B1 * | 9/2007 | Aguilar et al. | 704/230 |
| 7,363,219 | B2 * | 4/2008 | Stachurski | 704/223 |
| 2002/0052734 | A1 * | 5/2002 | Unno et al. | 704/207 |
| 2002/0116184 | A1 | 8/2002 | Gottsman et al. | 704/220 |
| 2003/0028371 | A1 * | 2/2003 | Chen et al. | 704/203 |
| 2003/0028386 | A1 * | 2/2003 | Zinser et al. | 704/500 |
| 2003/0115051 | A1 * | 6/2003 | Chen et al. | 704/230 |

(Continued)

FOREIGN PATENT DOCUMENTS

| | | | |
|---|---|---|---|
| WO | 00/33297 | 8/2000 | G10L 19/00 |
| WO | 01/22403 | 3/2001 | G10L 19/14 |

OTHER PUBLICATIONS

Supplee, L.M.; Cohn, R.P.; Collura, J.S.; McCree, A.V., "MELP: the new Federal Standard at 2400 bps," Acoustics, Speech, and Signal Processing, 1997. ICASSP-97., 1997 IEEE International Conference on , vol. 2, no., pp. 1591-1594 vol. 2, Apr. 21-24, 1997.*

(Continued)

*Primary Examiner* — Richemond Dorvil
*Assistant Examiner* — Michael Ortiz Sanchez
(74) *Attorney, Agent, or Firm* — Allen, Dyer, Doppelt, Milbrath & Gilchrist, P.A.

(57) ABSTRACT

A vocoder and method transcodes Mixed Excitation Linear Prediction (MELP) encoded data for use at different speech frame rates. Input data is converted into MELP parameters such as used by a first MELP vocoder. These parameters are buffered and a time interpolation is performed on the parameters with quantization to predict spaced points. An encoding function is performed on the interpolated data as a block to produce a reduction in bit-rate as used by a second MELP vocoder at a different speech frame rate than the first MELP vocoder.

15 Claims, 6 Drawing Sheets

(56) References Cited

U.S. PATENT DOCUMENTS

| | | | | |
|---|---|---|---|---|
| 2003/0125939 | A1* | 7/2003 | Zinser et al. | 704/219 |
| 2003/0135366 | A1 | 7/2003 | Zinser, Jr. et al. | 704/229 |
| 2003/0195006 | A1* | 10/2003 | Choong et al. | 455/450 |
| 2004/0153317 | A1* | 8/2004 | Chamberlain | 704/219 |
| 2004/0192361 | A1 | 9/2004 | Yossef et al. | 455/505 |
| 2005/0065788 | A1* | 3/2005 | Stachurski | 704/229 |
| 2005/0075869 | A1* | 4/2005 | Gersho et al. | 704/223 |
| 2005/0159943 | A1* | 7/2005 | Zinser et al. | 704/219 |
| 2005/0228651 | A1* | 10/2005 | Wang et al. | 704/207 |
| 2006/0069554 | A1 | 3/2006 | Gottesman et al. | 704/222 |
| 2009/0125315 | A1* | 5/2009 | Koishida et al. | 704/503 |

OTHER PUBLICATIONS

Ray, B., "Performance of Voice Coders under Military Conditions," Speech Coding for Algorithm for Radio Channels (Ref. No. 2000/012), IEE Seminar, 2000.*

Chamberlain, M. W. Ed., "*A 600 BPS MELP Vocoder for use of HF Channels," Institute of Electrical and Electronics Engineers*, IEEE Military Communications Conference New York, New York, Proceedings, Communication for Network-Centric Operations: Creating the Information Force, Mclean, VA, vol. 1, Oct. 28, 2001, pp. 447-453.

* cited by examiner

VOCODER AND ASSOCIATED METHOD THAT TRANSCODES BETWEEN MIXED EXCITATION LINEAR PREDICTION (MELP) VOCODERS WITH DIFFERENT SPEECH FRAME RATES

FIELD OF THE INVENTION

The present invention relates to communications, more particularly, the present invention relates to voice coders (vocoders) used in communications.

BACKGROUND OF THE INVENTION

Voice coders, also termed vocoders, are circuits that reduce bandwidth occupied by voice signals, such as by using speech compression technology, and replace voice signals with electronically synthesized impulses. For example, in some vocoders an electronic speech analyzer or synthesizer converts a speech waveform to several simultaneous analog signals. An electronic speech synthesizer can produce artificial sounds in accordance with analog control signals. A speech analyzer can convert analog waveforms to narrow band digital signals. Using some of this technology, a vocoder can be used in conjunction with a key generator and modulator/demodulator device to transmit digitally encrypted speech signals over a normal narrow band voice communication channel. As a result, the bandwidth requirements for transmitting digitized speech signals are reduced.

A new military standard vocoder (MIL-STD-3005) algorithm is referred to as the Mixed Excitation Linear Prediction (MELP), which operates at 2.4 Kbps. When a vocoder is operated using this algorithm, it has good voice quality under benign error channels. When the vocoder is subjected to a HF channel with typical power output of a ManPack Radio (MPR), however, the vocoder speech quality is degraded. It has been found that a 600 bps vocoder provides a significant increase in secure voice availability relative to the 2.4 Kbps vocoder.

A need exists for a low rate speech vocoder with the same or better speech quality and intelligibility as compared to that of a typical 2.4 Kbps Linear Predictive Coding (LPC10e) based system. A MELP speech vocoder at 600 bps would take advantage of robust and lower bit-rate waveforms than the current 2.4 Kbps LPC10e standard, and also benefit from better speech quality of the MELP vocoder parametric model. Tactical ManPack Radios (MPR) typically require lower bit-rate waveforms to ensure 24-hour connectivity using digital voice. Once HF users receive reliable, good quality digital voice, wide acceptance will provide for better security by all users. An HF user will also benefit from the inherent digital squelch of digital voice and the elimination of atmospheric noise in the receive audio.

Current 2.4 Kbps vocoders using the LPC10e standard have been widely used within encrypted voice systems on HF channels. A 2.4 Kbps system, however, allows for communication on narrow-band HF channels with only limited success. A typical 3 kHz channel requires a relatively high signal-to-noise ratio (SNR) to allow reliable secure communications at the standard 2.4 Kbps bit rate. Even use of MIL-STD-188-110B waveforms at 2400 bps would still require a 3 kHz SNR of more than +12 dB to provide a usable communication link over a typical fading channel.

While HF channels typically permit a 2400 bps channel using LPC10e to be relatively error free, the voice quality is still marginal. Speech intelligibility and acceptability of these systems are limited to the amount of background noise level at the microphone. The intelligibility is further degraded by the low-end frequency response of communications handsets, such as the military H-250. The MELP speech model has an integrated noise pre-processor that improves sensitivity in the vocoder to both background noise and low-end frequency roll-off. The 600 bps MELP vocoder would benefit from this type of noise pre-processor and the improved low-end frequency insensitivity of the MELP model.

In some systems vocoders are cascaded, which degrades the speech intelligibility. A few cascades can reduce intelligibility below usable levels, for example, RF 6010 standards. Transcoding between cascades greatly reduces the intelligibility loss in which digital methods are used instead of analog. Transcoding between vocoders with different frame rates and technology has been found difficult, however. There are also known systems that transcode between “like” vocoders to change bit rates. One prior art proposal has created transcoding between LPC10 and MELPe. A source code can also provide MELP transcoding between MELP1200 and 2400 systems.

SUMMARY OF THE INVENTION

A vocoder and associated method transcodes Mixed Excitation Linear Prediction (MELP) encoded data for use at different speech frame rates. Input data is converted into MELP parameters used by a first MELP vocoder. These parameters are buffered and a time interpolation is performed on the parameters with quantization to predict spaced points. An encoding function is performed on the interpolated data as a block to produce a reduction in bit-rate as used by a second MELP vocoder at a different speech frame rate than the first MELP vocoder.

In yet another aspect, the bit-rate is transcoded with a MELP 2400 vocoder to bit-rates used with a MELP 600 vocoder. The MELP parameters can be quantized for a block of voice data from unquantized MELP parameters of a plurality of successive frames within a block. An encoding function can be performed by obtaining unquantized MELP parameters and combining frames to form one MELP 600 BPS frame, creating unquantized MELP parameters, quantizing the MELP parameters of the MELP 600 BPS frame, and encoding them into a serial data stream. The input data can be converted into MELP 2400 parameters. The MELP 2400 parameters can be buffered using one frame of delay. Twenty-five millisecond spaced points can be predicted, and in one aspect, the bit-rate is reduced by a factor of four.

In yet another aspect, a vocoder and associated method transcodes Mixed Excitation Linear Prediction (MELP) encoded data by performing a decoding function on input data in accordance with parameters used by a second MELP vocoder at a different speech frame rate. The sampled speech parameters are interpolated and buffered and an encoding function on the interpolated parameters is performed to increase the bit-rate. The interpolation can occur at 22.5 millisecond sampled speech parameters and buffering interpolated parameters can occur at about one frame. The bit-rate can be increased by a factor of four.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
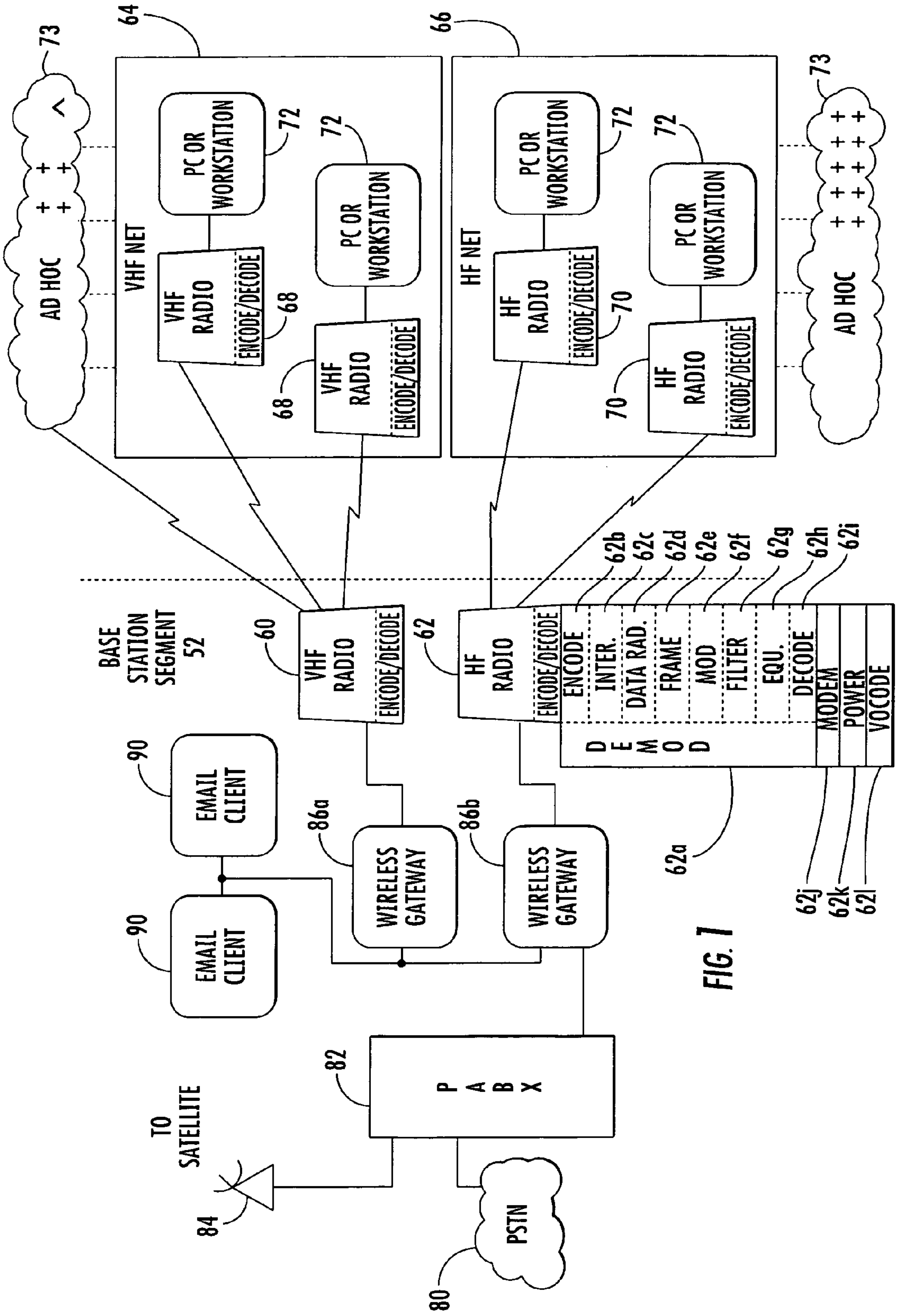
FIG. 1 is a block diagram of an example of a communications system that can be used for the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As general background for purposes of understanding the present invention, it should be understood that Linear Predictive Coding (LPC) is a speech analysis system and method that encodes speech at a low bit rate and provides accurate estimates of speech parameters for computation. LPC can analyze a speech signal by estimating the formants as a characteristic component of the quality of a speech sound. For example, several resonant bands help determine the frenetic quality of a value. Their effects are removed from a speech signal and the intensity and frequency of the remaining buzz is estimated. Removing the formants can be termed inverse filtering and the remaining signal termed a residue. The numbers describing the formants and the residue can be stored or transmitted elsewhere.

LPC can synthesize a speech signal by reversing the process and using the residue to create a source signal, using the formants to create a filter, representing a tube, and running the source through the filter, resulting in speech. Speech signals vary with time and the process is accomplished on small portions of a speech signal called frames with usually 30 to 50 frames per second giving intelligible speech with good compression.

A difference equation can be used to determine formants from a speech signal to express each sample of the signal as a linear combination of previous samples using a linear predictor, i.e., linear predictive coding (LPC). The coefficients of a difference equation as prediction coefficients can characterize the formants such that the LPC system can estimate the coefficients by minimizing the mean-square error between the predicted signal and the actual signal. Thus the computation of a matrix of coefficient values can be accomplished with a solution of a set of linear equations. The autocorrelation, covariance, or recursive lattice formulation techniques can be used to assure convergence to a solution.

There is a problem with tubes that have side branches, however. For example, for ordinary vowels, a vocal tract is represented by a single tube, but for nasal sounds there are side branches. Thus nasal sounds require more complicated algorithms. Because some consonants are produced by a turbulent air flow resulting in a "hissy" sound, the LPC encoder typically must decide if a sound source is a buzz or hiss and estimate frequency and intensity and encode information such that a decoder can undo the steps. The LPC-10e algorithm uses one number to represent the frequency of the buzzer and the number 0 to represent hiss. It is also possible to use a code book as a table of typical residue signals in addition to the LPC-10e. An analyzer could compare residue to entries in a code book and choose an entry that has a close match and send the code for that entry. This could be termed code excited linear prediction (CELP). The LPC-10e algorithm is described in federal standard 1015 and the CELP algorithm is described in federal standard 1016, the disclosures which are hereby incorporated by reference in their entirety.

The mixed excitation linear predictive (MELP) vocoder algorithm is the 2400 bps federal standard speech coder selected by the United States Department of Defense (DOD) digital voice processing consortion (DDVPC). It is somewhat different than the traditional pitch-excited LPC vocoders that use a periodic post train or white noise as an excitation, foreign all-pole synthesis filter, in which vocoders produce intelligible speech at very low bit rates that sound mechanical buzzy. This typically is caused by the inability of a simple pulse train to reproduce voiced speech.

A MELP vocoder uses a mixed-excitation model based on a traditional LPC parametric model, but includes the additional features of mixed-excitation, periodic pulses, pulse dispersion and adaptive spectral enhancement. Mixed excitation uses a multi-band mixing model that simulates frequency dependant voicing strength with adaptive filtering based on a fixed filter bank to reduce buzz. With input speeches voice, the MELP vocoder synthesizes speech using either periodic or aperiodic pulses. The pulse dispersion is implemented using fixed pulse dispersion filters based on a spectrally flattened triangle pulse that spreads the excitation energy with the pitch. An adaptive spectral enhancement filter based on the poles of the LPC vocal tract filter can enhance the formant structure in synthetic speech. The filter can improve the match between synthetic and natural bandpass waveforms and introduce a more natural quality to the speech output. The MELP coder can use Fourier Magnitude Coding of the prediction residual to improve speech quality and vector quantization techniques to encode the LPC and Fourier information.

In one accordance with non-limiting examples of the present invention, a vocoder transcodes the US DoD's military vocoder standard defined in MIL-STD-3005 at 2400 bps to a fixed bit-rate of 600 bps without performing MELPe 2400 analysis. This process is reversible such that MELPe 600 can be transcoded to MELPe 2400. Telephony operation can be improved when multiple rate bit-rate changes are necessary when using a multi-hop network. The typical analog rate change when cascading vocoders at different bit-rates can quickly degrade the voice quality. The invention discussed here allows multiple rate changes (2400→600→2400→600→ . . . ) without severely degrading the digital speech. It should understood that throughout this description, MELP with the suffix "e" is synonymous with MELP without the "e" in order to prevent confusion.

The vocoder and associated method can improve the speech intelligibility and quality of a telephony system operating at bit-rates of 2400 or 600 bps. The vocoder includes a coding process using the parametric mixed excitation linear prediction model of the vocal tract. The resulting 600 bps speech achieves very high Diagnostic Rhyme Test (DRT, a measure of speech intelligibility) and Diagnostic Acceptability Measure (DAM, a measure of speech quality) scores than vocoders at similar bit-rates. The resulting 600 bps vocoder is used in a secure communication system allowing communication on high frequency (HF) radio channels under very poor signal to noise ratios and/or under low transmit power conditions. The resulting MELP 600 bps vocoder results in a communication system that allows secure speech radio traffic to be transferred over more radio links more often throughout the day than the MELP 2400 based system. Backward compatibility can occur by transcoding MELP 600 to MELP 2400 for systems that run at higher rates or that do not support MELP 600.

In accordance with a non-limiting example of the present invention, a digital transcoder is operative at MELPe 2400 and MELPe 600 using transcoding as the process of encoding or decoding between different application formats or bit-rates. It is not considered cascading vocoders. In accordance with one non-limiting example of the present invention, the vocoder and associated method converts between MELP 2400 MELP 600 data formats in real-time with a four rate increase or reduction, although other rates are possible. The transcoder can use an encoded bit-stream. The process is lossy during the initial rate change only when multiple rate changes do not rapidly degrade speech quality after the first rate change. This allows MELPe 2400 only capable systems to operate with high frequency (HF) HF MELPe 600 capable systems.

The vocoder and method improves RF6010 multi-hop HF-VHF link speech quality. It can use a complete digital system with a vocoder analysis and synthesis running once per link, independent of number of up/down conversions (rate changes). Speech distortion can be minimized to the first rate change, and a minimal increase in speech distortion can occur with the number of rate changes. Network loading can decrease from 64K to 2.4K and use compressed speech over network. The F2-H requires transcoding SW, and a 25 ms increase in audio delay during transcoding.

The system can have digital VHF-F secure voice retransmission for F2-H and F2-F/F2-V radios and would allow MELPe 600 operation into a US DoD MELPe based VOIP system. The system could provide US DoD/NATO MELPe 2400 ineroperability with an MELPe 600 vocoder, such as manufactured by Harris Corporation of Melbourne, Fla. For purposes of illustration, an example of speech with RF 6010 is shown below:

ANALOG—No Transcoding (4 radio circuit)
  CVSD→CVSD→ulaw→RF6010→ulaw→M6→M6
  M6→M6-.ulaw→RF6010→ulaw→CVSD→CVSD
DIGITAL—with Transcoding (4 radio circuit)
  M24→bypass→RF6010→M24 to 6→M6
  M6→M6 to 24→RF6010→bypass→M24
Bypass=>vocoder in data bypass, No ulaw used in Digital system.

The vocoder and associated method uses an improved algorithm for an MELP 600 vocoder to send and receive data from a MIL-STD/NATO MELPe 2400 vocoder. An improved RF 6010 system could allow better speech quality using a transcoding base system MELP analysis and synthesis would be preformed only once over a multi-hop network.

In accordance with one non-limiting example of the present invention, it is possible to transcode down from 2400 to 600 and convert input data into MELP 2400 parameters. There is a one frame delay with buffer parameters and the system and method can perform time interpolation of parameters with quantization to predict 25 ms "spaced points". Thus, it is possible to perform a MELP 600 analysis on interpolated data with a block of four. This results in a factor of four reduction and a bit-rate that is now compatible with a MELP 600 vocoder such that MELP 2400 data is received and MELP 600 data is transmitted from a system.

It is also possible to transcode up from 600 to 2400 and perform MELPe 600 synthesis on input data. A vocoder would interpolate 22.5 ms sampled speech parameters and buffer interpolated parameters at one frame. The MELP 2400 analysis can be performed on the interpolated parameters. This results in a factor of four increase in bit-rate that is now compatible with MIL-STD/NATO MELP 2400 to allow MELP 600 data to be received and MELP 2400 data to be transmitted.

The vocoder and associated method in accordance with the non-limiting aspect of the invention can transcode bit-rates between vocoders with different speech frame rates. The analysis window can be a different size and would not have to be locked between rate changes. A change in frame rate would not present additional distortion after the initial rate change. It is possible for the algorithm to have better quality digital voice on the RF 6010 cross-net links. The AN/PRC-117F does not support MELPe 600, but uses the algorithm to communicate with an AN/PRC-150C running MELPe 600 over the air using an RF6010 system. The AN/PRC-150C runs the transcoding and the AN/PRC-150C has the ability to perform both transmit and receive transcoding using an algorithm in accordance with one non-limiting aspect of the present invention.

An example of a communications system that can be used with the present invention is now set forth with regard to FIG. 1.

An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62*a* and appropriate convolutional encoder circuit 62*b*, block interleaver 62*c*, data randomizer circuit 62*d*, data and framing circuit 62*e*, modulation circuit 62*f*, matched filter circuit 62*g*, block or symbol equalizer circuit 62*h* with an appropriate clamping device, deinterleaver and decoder circuit 62*i* modem 62*j*, and power adaptation circuit 62*k* as non-limiting examples. A vocoder circuit 62*l* can incorporate the decode and encode functions and a conversion unit which could be a combination of the various circuits as described or a separate circuit. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86*a*, 86*b*. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 2:
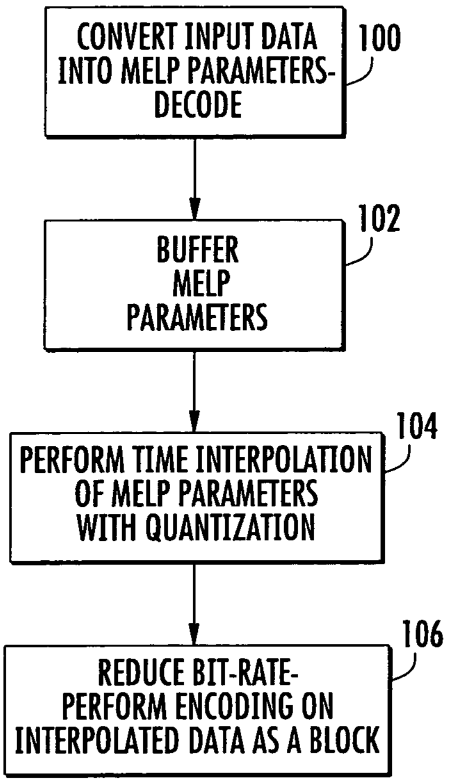
FIG. 2 a high-level flowchart illustrating basic steps used in transcoding down from MELP 2400 to MELP 600.

FIG. 2 is a high-level flowchart beginning in the 100 series of reference numerals showing basic details for transcoding down from MELP 2400 to MELP 600 and showing the basic steps of converting the input data into MELP parameters such as 2400 parameters as a decode. As shown in step 102, parameters are buffered, such as with a one frame of delay. A time interpolation is performed of MELP parameters with quantization shown at block 104. The bit-rate is reduced and encoding performed on the interpolated data (Block 106). In this step, the encoding can be accomplished using an MELP 600 encode algorithm such as described in commonly assigned U.S. Pat. No. 6,917,914, the disclosure which is hereby incorporated by reference in its entirety. This '914 patent discloses a system to improve speech intelligibility and quality of a vocoder, as best described in a summary of the algorithm at column 2, starting at line 57 through column 4 at line 19, reproduced below:

> Embodiments of the disclosed subject matter overcome these and other problems in the art by presenting a novel system and method for improving the speech intelligibility and quality of a vocoder operation at a bit rate of 600 bps. The disclosed subject matter presents a coding process using the parametric mixed excitation linear prediction model of the vocal tract. The resulting 600 bps vocoder achieves very high Diagnostic Rhyme Test scores (DRT, A measure of speech intelligibility) and Diagnostic Acceptability measure scores (DAM, A measure of speech quality), these tests described in Voiers, William D., "Diagnostic Acceptability measure (DAM): A Method for Measuring the Acceptability of Speech over Communication System", Dynastat, Inc.: Austin Tex. and Voiers, William D., "Diagnostic Evaluation of Speech Intelligibility.", in M. E. Hawley, Ed, Speech Intelligibility and Speech Recognition (Dowder, Huchinson, and Ross: Stroudsburg, Pa. 1977) both of which are herein incorporated by reference. The scores on these tests are higher than vocoders at similar bit rates published in recent literature. The resulting 600 bps vocoder can be used in a secure communication system allowing communication on High Frequency (HF) radio channels under very poor signal to noise ratios and or under low transmit power conditions. The resulting MELP 600 bps vocoder results in a communication system that allows secure speech radio traffic to be transferred over more radio links more often throughout the day than the MELP 2400 bps based system.

The subject matter of the disclosure uses Vector Quantization techniques to reduce the effective bit-rate necessary to send intelligible speech over a bandwidth constrained channel. Harsh High Frequency (HF) channels which are limited to only 3 kHz causes modems to require low bit-rates to maintain intelligible speech. The disclosed subject matter vector quantizes the mixed excitation linear prediction speech model parameters to achieve a fixed bit rate of 600 bps while still providing relatively good speech intelligibility and quality.

It is an object of the disclosed subject matter to present in a voice communication system operating on a bandwidth constrained channel, novel methods of transmitting and receiving a voice signal. An embodied method including the steps of obtaining a plurality of sub blocks of speech representing the voice signal and generating unquantized MELP parameters for each of the sub blocks of speech. The embodied method further involves quantizing the plurality of sub blocks of speech as an output block using the unquantized MELP parameters of each of the blocks to create quantized MELP parameters of the output block. The quantized output block is encoded into a serial bit stream and transmitted over a bandwidth constrained channel. In a method embodying the disclosed subject matter, the serial bit stream is received and the quantized MELP parameters of the output block are extracted. The embodiment method also include decoding the quantized MELP parameters to form unquantized MELP parameters associated with output block of speech and creating from them unquantized MELP parameters for each of the sub blocks. The method reconstructs the voice signal sequentially for each sub block from their associated unquantized MELP parameters.

It is also an object of the disclosed subject matter to present in a voice communication system, a novel method of transcoding four MELP 2400 bps frames 25 ms in length into a MELP 600 bps frame 100 ms in length for voice communication over a bandwidth limited channel. Embodiments of the method include obtaining unquantized MELP parameters from each of the MELP 2400 bps frames and combining them to form one MELP 600 bps 100 ms frame. An embodiment of the method creates unquantized MELP parameters for the MELP 600 bps 100 ms frame from unquantized MELP parameters from the MELP 2400 bps frames and quantizes the MELP parameters of the MELP 600 bps 100 ms frame and encoding them into a 60 bit serial stream for transmission.

It is further an object of the disclosed subject matter to present in a voice communication system, a novel method of formatting quantized vectors for transmission and reception of 100 ms of speech. Embodiments of the method quantizing a first half spectrum from a set of unquantized MELP parameter associated with a first set of plural frames of speech; and encoding the first half spectrum in 19 bits of a 60 bit serial stream, quantizing a second half spectrum from another set of unquantized MELP parameters associated with a second set of plural blocks of speech; and encoding the second half spectrum in 19 bits of the 60 bit serial stream. Embodiments also quantizing a bandpass voicing parameter created from the unquantized MELP parameters of the first and second set of plural blocks of speech; and encoding the quantized bandpass voicing parameter in 4 bits the 60 bit serial stream; and quantizing a pitch voicing parameter created from the unquantized MELP parameters of the first and second set of plural blocks of speech; and encoding the quantized pitch parameters in 7 bits of the 60 bit serial stream. The embodied method also includes the step of quantizing a gain parameter created from the unquantized MELP parameters of the first and second set of plural blocks of speech, and encoding the quantized gain parameters in 11 bits of the 60 bit serial stream.

Figure 3:
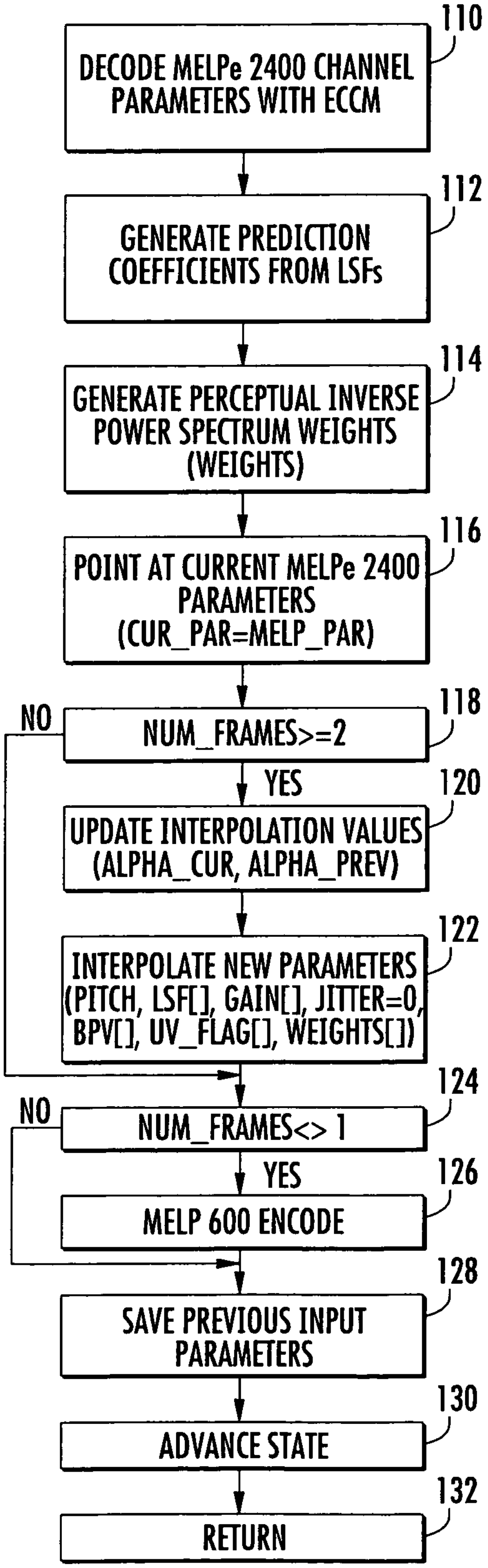
FIG. 3 is a more detailed flowchart illustrating the basic steps used in transcoding down from MELP 2400 to MELP 600.

FIG. 3 shows greater details of the transcoding down from MELP 2400 to MELP 600 in accordance with a non-limiting example of the present invention.

As illustrated in the steps shown in FIG. 3, MELP 2400 channel parameters with electronic counter countermeasures (ECCOM) are decoded (Block 110). Prediction coefficients from line spectral frequencies (LSF) are generated (Block 112). Perceptual inverse power spectrum weights are generated (block 114). The current MELP 2400 parameters are pointed (block 116). If the number of frames is greater than or equal to 2 (block 118), the update of interpolation values occurs (block 120). The interpolation of new parameters includes pitch, line spectral frequencies, gain, jitter, bandpass voice, unvoiced and voiced data and weights (Block 122). If at the step for Block 118 the answer is no, then the steps for Blocks 120 and 122 are skipped. The number of frames has been determined (Block 124) and the MELP 600 encode process occurs (Block 126). The MELP 600 algorithm such as disclosed in the '914 patent is preferably used. The previous input parameters are saved (Block 128) and the advanced state occurs (Block 130) and the return occurs (Block 132).

Figure 4:
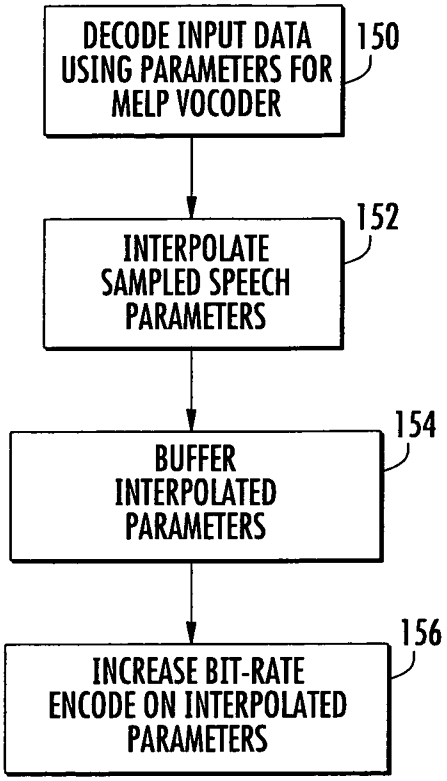
FIG. 4 is a high-level flowchart illustrating basic steps used in transcoding up from MELP 600 to MELP 2400.

FIG. 4 is a high-level flowchart illustrating a transcoding up from MELP 600 to MELP 2400 and showing the basic high-level functions. As shown at block 150, the input data is decoded using the parameters for the MELP vocoder such as the process disclosed in the incorporated by reference '914 patent. At block 152, the sampled speech parameters are interpolated and the interpolated parameters buffered as shown at Block 154. The bit-rate is increased through the encoding on the interpolated parameters as shown at Block 156.

Figure 5:
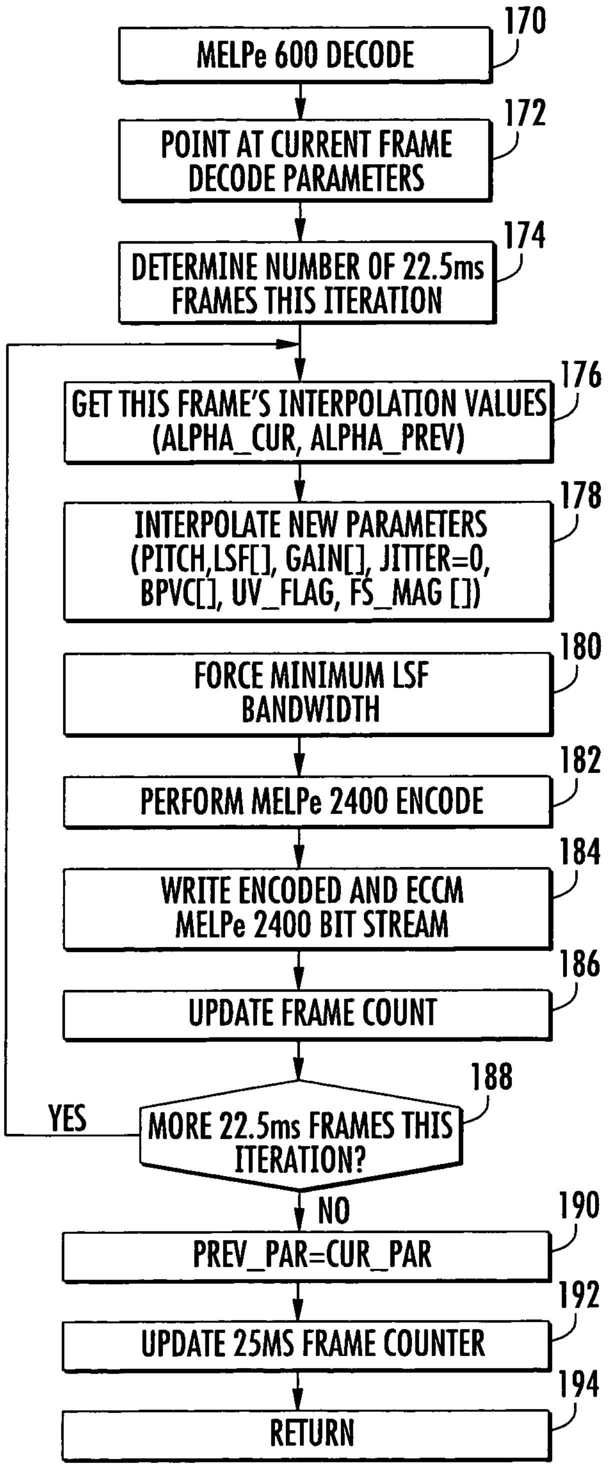
FIG. 5 is a more detailed flowchart showing greater details of the steps used in transcoding up from MELP 600 to MELP 2400.

Greater details of the transcoding up from MELP 600 to MELP 2400 are shown in FIG. 5 as a non-limiting example.

The MELPe 600 decode function occurs on data such as the process disclosed in the '914 patent (Block 170). The current frame decode parameters are pointed at (Block 172) and the number of 22.5 millisecond frames are determined for this iteration (Block 174).

This frame's interpolation values are obtained (Block 176) and the new parameters interpolated (Block 178). A minimum line sequential frequency (LSF) is forced to minimum (Block 180) and the MELP 2400 encode performed (Block 182). The encoded ECCM MELP 2400 bit-stream is written (Block 184) and the frame count updated (Block 186). If there are more 22.5 millisecond frames in this iteration (Block 188), the process begins again at Block 176. If not, a comparison is made (Block 190) and the 25 millisecond frame counter updated (Block 192). The return is made (Block 194).

An example of pseudocode for the algorithm as described is set forth below:

```
SIG__LENGTH = 327
BUFSIZE24 = 7
X025__Q15 = 8192
LPC__ORD = 10
NUM__GAINFR = 2
NUM__BANDS = 5
NUM__HARM = 10
BWMIN__Q15 = 50.0
// melp__param format
//structure melp__param {/* MELP parameters */
//      var pitch;
//      var lsf[LPC__ORD];
//      var gain[NUM__GAINFR];
//      var jitter;
//      var bpvc[NUM__BANDS];
//      var uv__flag;
//      var fs__mag[NUM__HARM];
//      var weights[LPC__ORD];
//};
structure melp__param cur__par, prev__par
var top__lpc[LPC__ORD]
var interp600__down[10][2] =
{//prev, cur
      { 0.0000, 1.0000},
      { 0.0000, 0.0000},
      { 0.8888, 0.1111},
      { 0.7777, 0.2222},
      { 0.6666, 0.3333},
      { 0.5555, 0.4444},
      { 0.4444, 0.5555},
      { 0.3333, 0.6666},
      { 0.2222, 0.7777},
      { 0.1111, 0.8888}
}
var interp600__up[10][2] =
{//prev, cur
      {0.1000, 0.9000},
      {0.2000, 0.8000},
      {0.3000, 0.7000},
      {0.4000, 0.6000},
      {0.5000, 0.5000},
      {0.6000, 0.4000},
      {0.7000, 0.3000},
      {0.8000, 0.2000},
      {0.9000, 0.1000},
      {0.0000, 1.0000}
}
/* convert MELPe 2400 encoded data to MELPe 600 encoded data */
function transcode600__down( )
{
      var num__frames = 0
      var lsp[10]
      var lpc[11]
      var i,alpha__cur,alpha__prev,numBits
1.          Read and decode the MELPe 2400 encoded data
      melp__chn__read(&quant__par, &melp__par[0], &prev__par, &chbuf[0])
2.          Generate the perceptual inverse power spectrum weights from the decoded
parameters
      lsp[i] = melp__par->lsf[i] i=0,..,9
      lpc__lsp2pred(lsp, lpc, LPC__ORD)
      vq__lspw(&melp__par->weights[0], lsp, lpc, LPC__ORD)
3.          Point at the current frames parameters
      cur__par = melp__par[0]
4.          if num__frames < 2 goto step 7
      if(num__frames < 2) goto step 7
5.          Get this iterations interpolation values
      alpha__cur   =     interp600__down[num__frames][1]
      alpha__prev =     interp600__down[num__frames][0]
6.          Interpolate MELPe voice parameters
      melp__par->pitch = alpha__cur * cur__par.pitch
              + alpha__prev * prev__par.pitch
      melp__par->lsf[i] = alpha__cur * cur__par.lsf[i]
               + alpha__prev * prev__par.lsf[i] i=0,..,9
      melp__par->gain[i] = alpha__cur * cur__par.gain[i]
                  + alpha__prev * prev__par.gain[i] i=0,..,1
      melp__par->jitter = 0
      melp__par->bpvc[i] = alpha__cur * cur__par.bpvc[i]
```

-continued

```
                + alpha__prev * prev__par.bpvc[i] i=0,..,4
    if(melp__par->bpvc[i] >= 8192) then melp__par->bpvc[i] = 16384 i=0,..,4
    else melp__par->bpvc[i] = 0
    melp__par->uv__flag = alpha__cur * cur__par.uv__flag
                + alpha__prev * prev__par.uv__flag
    if(melp__par->uv__flag >= 16384) then melp__par->uv__flag = 1
    else melp__par->uv__flag = 0
    melp__par->fs__mag[i] = alpha__cur * cur__par.fs__mag[i]
                  + alpha__prev * prev__par.fs__mag[i] i=0,..,9
    melp__par->weights[i] = alpha__cur * cur__par.weights[i]
                    + alpha__prev * prev__par.weights[i] i=0,..,9
7.        Call Melp600 Encode when num__frames <> 1, returning the encoded bit
count in numBits
    if(num__frames <> 1) then numBits = Melp600Encode( )
    else numBits = 0
8.        Save the current parameters for use next time
    prev__par = cur__par
9.        Update num__frames
    num__frames = num__frame + 1
    if(num__frames == 10) then num__frames = 0
10.       Return the number of encoded MELPe 600 bits this block
    return numBits
11.       Process next input block
function transcode600__up( )
{
    var frame,i,frame__cnt
    var lpc[LPC__ORD + 1], weights[LPC__ORD]
    var lsp[10]
    var num__frames22P5ms = 0, num__frames25ms = 0
    var Frame22P5MSCount[9]={1,1,1,1,1,1,1,1,2}
    var alpha__cur,alpha__prev
1.        Decode MELPe 600 encoded parameters
    Melp600Decode( )
2.        Point at this frames MELPe voice parameters
    cur__par = melp__par[0]
3.        Get this iterations number of frames to process
          frame__cnt = Frame22P5MSCount[num__frames25ms]
            frame = 0
4.        Get this frames interpolation values
          alpha__cur  = interp600__up[num__frames22P5ms][1]
          alpha__prev = interp600__up[num__frames22P5ms][0]
5.        Interpolate new MELPe voice parameters (from Melp600 Decode)
          melp__par->pitch = alpha__cur * cur__par.pitch
                + alpha__prev * prev__par.pitch
          melp__par->lsf[i] = alpha__cur * cur__par.lsf[i]
                + alpha__prev * prev__par.lsf[i] i=0,..,9
          melp__par->gain[i] = alpha__cur * cur__par.gain[i]
                  + alpha__prev * prev__par.gain[i] i=0,..,1
          melp__par->jitter = alpha__cur * cur__par.jitter
                            + alpha__prev * prev__par.jitter
          if(melp__par->jitter >= 4096)then melp__par->jitter = 8192
          else melp__par->jitter = 0
          melp__par->bpvc[i] = alpha__cur * cur__par.bpvc[i]
                + alpha__prev * prev__par.bpvc[i] i=0,..,4
          if(melp__par->bpvc[i] >= 8192)then melp__par->bpvc[i] = 16384
          i=0,..,4
                  else melp__par->bpvc[i] = 0
                  melp__par->uv__flag = alpha__cur * cur__par.uv__flag
                  + alpha__prev * prev__par.uv__flag
          if(melp__par->uv__flag >= 16384) then melp__par->uv__flag = 1
          else melp__par->uv__flag = 0
                  melp__par->fs__mag[i] = alpha__cur * cur__par.fs__mag[i]
                    + alpha__prev * prev__par.fs__mag[i] i=0,..,9
6.        Limit the minimum bandwidth of the new interpolated LSFs
          lpc__clamp(melp__par->lsf, BWMIN__Q15, LPC__ORD)
7.        Generate new perceptual inverse power spectrum weights using
the new LSFs
          lsp[i] = melp__par->lsf[i] i=0,..,9
          lpc__lsp2pred(lsp, lpc, LPC__ORD)
          vq__lspw(weights, lsp, lpc, LPC__ORD)
8.        Encode the new MELPe voice parameters without performing
analysis
          melp2400__encode( )
10.       Write the encoded MELPe 2400 bit stream
          melp__chn__write(&quant__par, &chbuf[frame*BUFSIZE24])
11.       Update the 22.5 ms frame counter
          num__frames22P5ms = num__frames22P5ms + 1
          if(num__frames22P5ms == 10) num__frames22P5ms = 0
12.       Increment frame
    frame = frame + 1
```

-continued

| | |
|---|---|
| 13. | Goto to step 4 if frame <> frame__cnt<br>If frame <> frame__cnt then goto step 4 |
| 14. | Save the current parameters from the previous interation<br>prev__par = cur__par |
| 15. | Update the 25 ms frame counter<br>num__frames25ms = num__frames25ms + 1<br>if(num__frames25ms == 9) num__frames25ms = 0 |
| 16. | Return the correct number of MELP 2400 bits this frame<br>if(frame__cnt == 2) then return(108)<br>else return(54) |
| 17. | Process the next input block |

It should be understood that an MELP 2400 vocoder can use a Fourier magnitude coding of a prediction residual to improve speech quality and vector quantization techniques to encode the LPC Fourier information. An MELP 2400 vocoder can include 22.5 millisecond frame size and an 8 kHz sampling rate. An analyzer can have a high pass filter such as a fourth order Chebychev type II filter with a cut-off frequency of about 60 Hz and a stopband rejection of about 30 dB. Butterworth filters can be used for bandpass voicing analysis. The analyzer can include linear prediction analysis and error protection with hamming codes. Any synthesizer could use mixed excitation generation with a sum of a filtered pulse and noise excitations. An inverse discrete Fourier transform of one pitch period in length and noise can be used and a uniform random number generator used. A pulse filter could have a sum of bandpass filter coefficients for voiced frequency bands and a noise filter could have a sum of bandpass filter coefficients for unvoiced frequency bands. An adaptive spectral enhancement filter could be used. There could also be linear prediction synthesis with a direct form filter and a pulse dispersion.

There is now described a 600 bps MELP vocoder algorithm that can take advantage of inherit inter-frame redundancy of MELP parameters, which could be used with the algorithm as described, in accordance with non-limiting examples of the present invention. Some data is presented showing the advantage in both diagnostic acceptability measure (DAM) and diagnostic rhyme test (DTR) with respect to the signal to noise ratio (SNR) on a typical HF channel when using the vocoder with a MIL-STD-188-110B waveform. This type of vocoder can be used in the system and method of the present invention.

The 600 bps system uses a conventional MELP vocoder front end, a block buffer for accumulating multiple frames of MELP parameters, and individual block vector quantizers for MELP parameters. The low-rate implementation of MELP uses a 25 ms frame length and the block buffer of four frames, for block duration of 100 ms. This yields a total of sixty bits per block of duration 100 ms, or 600 bits per second. Examples of the typical MELP parameters as coded are shown in Table 1.

TABLE 1

MELP 600 VOCODER

| SPEECH PARAMETERS | BITS |
|---|---|
| Aperiodic Flag | 0 |
| Band-Pass Voicing | 4 |
| Energy | 11 |
| Fourier Magnitudes | 0 |
| Pitch | 7 |
| Spectrum | (10 + 10 + 9 + 9) |

Details of the individual parameter coding methods are covered below, followed by a comparison of bit-error performance of a Vector Quantized 600 bps LPC10e based vocoder contrasted against a MELP 600 bps vocoder in one non-limiting example of the present invention. Results from a Diagnostic Rhyme Test (DRT) and a Diagnostic Acceptability Measure (DAM) for MELP 2400 and 600 at several different conditions are explained and compared with the results for LPC10e based systems under similar conditions. The DRT and DAM results represent testing performed by Harris Corporation and the National Security Agency (NSA).

It should be understood there is an LPC Speech Model. LPC10e has become popular because it typically preserves much of the intelligibility information, and because the parameters can be closely related to human speech production of the vocal tract. LPC10e can be defined to represent the speech spectrum in the time domain rather than in the frequency domain. An LPC10e analysis process or the transmit side produces predictor coefficients that model the human vocal tract filter as a linear combination of the previous speech samples. These predictor coefficients can be transformed into reflection coefficients to allow for better quantization, interpolation, and stability evaluation and correction. The synthesized output speech from LPC10e can be a gain scaled convolution of these predictor coefficients with either a canned glottal pulse repeated at the estimated pitch rate for voiced speech segments, or convolution with random noise representing unvoiced speech.

The LPC10e speech model used two half frame voicing decisions, an estimate of the current 22.5 ms frames pitch rate, the RMS energy of the frame, and the short-time spectrum represented by a $10^{th}$ order prediction filter. A small portion of the more important bits of a frame can be coded with a simple hamming code to allow for some degree of tolerance to bit errors. During unvoiced frames, more bits are free and used to protect more of the frame from channel errors.

The LPC10e model generates a high degree of intelligibility. The speech, however, can sound very synthetic and often contains buzzing speech. Vector quantizing of this model to lower rates would still contain the same synthetic sounding speech. The synthetic speech usually only degrades as the rate is reduced. A vocoder that is based on the MELP speech model may offer better sounding quality speech than one based on LPC10e. The vector quantization of the MELP model is possible.

There is also a MELP Speech model. MELP was developed by the U.S. government DoD Digital Voice Processing Consortium (DDVPC) as the next standard for narrow band secure voice coding. The new speech model represents an improvement in speech quality and intelligibility at the 2.4 Kbps data rate. The algorithm performs well in harsh acoustic noise such as HMMWV's, helicopters and tanks. Typically the buzzy sounding speech of LPC10e model is reduced to an acceptable level. The MELP model represents a next generation of speech processing in bandwidth constrained channels.

The MELP model as defined in MIL-STD-3005 is based on the traditional LPC10e parametric model, but also includes five additional features. These are mixed-excitation, aperiodic pulses, pulse dispersion, adaptive spectral enhancement, and Fourier magnitudes scaling of the voiced excitation.

The mixed excitation is implemented using a five band-mixing model. The model can simulate frequency dependent voicing strengths using a fixed filter bank. The primary effect of this multi-band mixed excitation is to reduce the buzz usually associated with LPC10e vocoders. Speech is often a composite of both voiced and unvoiced signals. MELP performs a better approximation of the composite signal than the Boolean voiced/unvoiced decision of LPC10e.

The MELP vocoder can synthesize voiced speech using either periodic or aperiodic pulses. Aperiodic pulses are most often used during transition regions between voiced and unvoiced segments of the speech signal. This feature allows the synthesizer to reproduce erratic glottal pulses without introducing tonal noise.

Pulse dispersion can be implemented using a fixed pulse dispersion filter based on a spectrally flattened triangle pulse. The filter is implemented as a fixed finite impulse response (FIR) filter. The filter has the effect of spreading the excitation energy within a pitch period. The pulse dispersion filter aims to produce a better match between original and synthetic speech in regions without a formant by having the signal decay more slowly between pitch pulses. The filter reduces the harsh quality of the synthetic speech.

The adaptive spectral enhancement filter is based on the poles of the LPC vocal tract filter and is used to enhance the formant structure in the synthetic speech. The filter improves the match between synthetic and natural band pass waveforms, and introduces a more natural quality to the output speech.

The first ten Fourier magnitudes are obtained by locating the peaks in the FFT of the LPC residual signal. The information embodied in these coefficients improves the accuracy of the speech production model at the perceptually important lower frequencies. The magnitudes are used to scale the voiced excitation to restore some of the energy lost in the $10^{th}$ order LPC process. This increases the perceived quality of the coded speech, particularly for males and in the presence of background noise.

There is also MELP 2400 Parameter entropy. The entropy values can be indicative of the existing redundancy in the MELP vocoder speech model. MELP's entropy is shown in Table 2 below. The entropy in bits was measured using the TIMIT speech database of phonetically balanced sentences that was developed by the Massachusetts Institute of Technology (MIT), SRI International, and Texas Instruments (TI). TIMIT contains speech from 630 speakers from eight major dialects of American English, each speaking ten phonetically rich sentences. The entropy of successive number of frames was also investigated to determine good choices of block length for block quantization at 600 bps. The block length chosen for each parameter is discussed in the following sections.

TABLE 2

MELP 2400 Entropy

| SPEECH PARAMETERS | BITS | ENTROPY |
|---|---|---|
| Aperiodic Flag | 1 | 0.4497 |
| Band-Pass Voicing | 5 | 2.4126 |
| Energy (G1 + G2) | 8 | 6.2673 |
| Fourier Magnitudes | 8 | 7.2294 |
| Pitch | 7 | 5.8916 |
| Spectrum | 25 | 19.2981 |

Vector quantization is the process of grouping source outputs together and encoding them as a single block. The block of source values can be viewed as a vector, hence the name vector quantization. The input source vector is compared to a set of reference vectors called a codebook. The vector that minimizes some suitable distortion measure is selected as the quantized vector. The rate reduction occurs as the result of sending the codebook index instead of the quantized reference vector over the channel.

The vector quantization of speech parameters has been a widely studied topic in current research. At low rate of quantization, efficient quantization of the parameters using as few bits as possible is essential. Using suitable codebook structure, both the memory and computational complexity can be reduced. One attractive codebook structure is the use of a multi-stage codebook. In addition, the codebook structure can be selected to minimize the effects of the codebook index to bit errors. The codebooks can be designed using a generalized Lloyd algorithm to minimize average weighted mean-squared error using the TIMIT speech database as training vectors. A generalized Lloyd algorithm consists of iteratively partitioning the training set into decisions regions for a given set of centroids. New centroids are then re-optimized to minimize the distortion over a particular decision region. The generalized Lloyd algorithm could be as follows.

An initial set of codebook values $\{Y_i^{(0)}\}_{i=1,M}$ and a set of training vectors $\{X_n\}_{n=1,N}$. Set k=0, $D^{(0)}=0$ are used and a threshold $\epsilon$ is selected;

The quantization region $\{V_i^{(k)}\}_{i=1,M}$ are given by $V_i^{(k)}=\{X_n: d(X_n,Y_i)<d(X_n,Y_j)\forall j\neq i\}$ i=1, 2, . . . , M;

The average distortion $D^{(k)}$ between the training vectors and the representative codebook value is computed;

If $(D^{(k)}-D^{(k-1)})/D^{(k)}<\epsilon$, the program steps; otherwise, it continues; and k=k+1. New codebook values $\{Y_i^{(k)}\}_{i=1,M}$ are found that are the average value of the elements of each quantization regions $V_i^{(k-1)}$.

The aperiodic pulses are designed to remove the LPC synthesis artifacts of short, isolated tones in the reconstructed speech. This occurs mainly in areas of marginally voiced speech, when reconstructed speech is purely periodic. The aperiodic flag indicates a jittery voiced state is present in the frame of speech. When voicing is jittery, the pulse positions of the excitation are randomized during synthesis based on a uniform distribution around the purely periodic mean position.

Investigation of the run-length of the aperiodic state indicates that the run-length is normally less than three frames across the TIMIT speech database and over several noise conditions tested. Further, if a run of aperiodic voiced frames does occur, it is unlikely that a second run will occur within the same block of four frames. It was decided not to send the Aperiodic bit over the channel since the effects on voice quality was not as significant as better quantizing the remaining MELP parameters.

The bandpass voicing (BPV) strengths control which of the five bands of excitation are voiced or unvoiced in the MELP model. The MELP standard sends the upper four bits individually while the least significant bit is encoded along with the pitch. Table 3 illustrates an example of the probability density function of the five bandpass voicing bits. These five bits can be easily quantized down to only two bits with typically little audible distortion. Further reduction can be obtained by taking advantage of the frame-to-frame redundancy of the voicing decisions. The current low-rate coder can use a four-bit codebook to quantize the most probable voicing transitions that occur over a four-frame block. A rate reduction from four frames of five bit bandpass voicing strengths can be reduced to four bits. At four bits, some audible differences are heard in the quantized speech. However, the distortion caused by the bandpass voicing is not offensive.

TABLE 3

MELP 600 BPV MAP

| BPV DECISIONS | PROB |
|---|---|
| Prob (u, u, u, u, u) | 0.15 |
| Prob (v, u, u, u, u) | 0.15 |
| Prob (v, v, v, u, u) | 0.11 |
| Prob (v, v, v, v, v) | 0.41 |
| Prob (remaining) | 0.18 |

MELP's energy parameter exhibits considerable frame-to-frame redundancy, which can be exploited by various block quantization techniques. A sequence of energy values from successive frames can be grouped to form vectors of any dimension. In the MELP 600 bps model, a vector length of four frames two gain values per frame can be used as a non-limiting example. The energy codebook can be created using a K-means vector quantization algorithm. The codebook was trained using training data scaled by multiple levels to prevent sensitivity to speech input level. During the codebook training process, a new block of four energy values is created for every new frame so that energy transitions are represented in each of the four possible locations within the block. The resulting codebook is searched resulting in a codebook vector that minimizes mean squared error.

For MELP 2400, two individual gain values are transmitted every frame period. The first gain value is quantized to five bits using a 32-level uniform quantizer ranging from 10.0 to 77.0 dB. The second gain value is quantized to three bits using an adaptive algorithm. In the MELP 600 bps model, the vector is quantized both of MELP's gain values across four frames. Using the 2048 element codebook, the energy bits per frame are reduced from 8 bits per frame for MELP 2400 down to 2.909 bits per frame for MELP 600. Quantization values below 2.909 bits per frame for energy have been investigated, but the quantization distortion becomes audible in the synthesized output speech and affected intelligibility at the onset and offset of words.

The excitation information is augmented by including Fourier coefficients of the LPC residual signal. These coefficients or magnitudes account for the spectral shape of the excitation not modeled by the LPC parameters. These Fourier magnitudes are estimated using a FFT on the LPC residual signal. The FFT is sampled at harmonics of the pitch frequency. In the current MIL-STD-3005, the lower ten harmonics can be considered more important and are coded using an eight-bit vector quantizer over the 22.5 ms frame.

The Fourier magnitude vector is quantized to one of two vectors. For unvoiced frames, a spectrally flat vector is selected to represent the transmitted Fourier magnitude. For voiced frames, a single vector is used to represent all voiced frames. The voiced frame vector can be selected to reduce some of the harshness remaining in the low-rate vocoder. The reduction in rate for the remaining MELP parameters reduce the effect seen at the higher data rates to Fourier magnitudes. No bits are required to perform the above quantization.

The MELP model estimates the pitch of a frame using energy normalized correlation of 1 kHz low-pass filtered speech. The MELP model further refines the pitch by interpolating fractional pitch values. The refined fractional pitch values are then checked for pitch errors resulting from multiples of the actual pitch value. It is this final pitch value that the MELP 600 vocoder uses to vector quantize.

MELP's final pitch value is first median filtered (order 3) such that some of the transients are smoothed to allow the low rate representation of the pitch contour to sound more natural. Four successive frames of the smoothed pitch values are vector quantized using a codebook with 128 elements. The codebook can be trained using a k-means method. The resulting codebook is searched resulting in the vector that minimizes mean squared error of voiced frames of pitch.

The LPC spectrum of MELP is converted to line spectral frequencies (LSFs) which is one of the more popular compact representations of the LPC spectrum. The LSF's are quantized with a four-stage vector quantization algorithm. The first stage has seven bits, while the remaining three stages use six bits each. The resulting quantized vector is the sum of the vectors from each of the four stages and the average vector. At each stage in the search process, the VQ search locates the "M best" closest matches to the original using a perceptual weighted Euclidean distance. These M best vectors are used in the search for the next stage. The indices of the final best at each of the four stages determine the final quantized LSF.

The low-rate quantization of the spectrum quantizes four frames of LSFs in sequence using a four-stage vector quantization process. The first two stages of codebook use ten bits, while the remaining two stages use nine bits each. The search for the best vector uses a similar "M best" technique with perceptual weighting as is used for the MIL-STD-3005 vocoder. Four frames of spectra are quantized to only 38 bits.

The codebook generation process uses both the K-Means and the generalized Lloyd technique. The K-Means codebook is used as the input to the generalized Lloyd process. A sliding window can be used on a selective set of training speech to allow spectral transitions across the four-frame block to be properly represented in the final codebook. The process of training the codebook can require significant diligence in selecting the correct balance of input speech content. The selection of training data can be created by repeatedly generating codebooks and logging vectors with above average distortion. This process can remove low probability transitions and some stationary frames that can be represented with transition frames without increasing the over-all distortion to unacceptable levels.

The Diagnostic Acceptability Measure (DAM) and the Diagnostic Rhyme Test (DRT) are used to compare the performance of the MELP vocoder to the existing LPC based system. Both tests have been used extensively by the US government to quantify voice coder performance. The DAM requires the listeners to judge the detectability of a diversity of elementary and complex perceptual qualities of the signal itself, and of the background environment. The DRT is a two choice intelligibility test based upon the principle that the intelligibility relevant information in speech is carried by a small number of distinctive features. The DRT was designed to measure how well information as to the state of six binary distinctive features (voicing, nasality, sustension, sibiliation, graveness, and compactness) have been preserved by the communications system under test.

The DRT performance of both MELP based vocoders exceeds the intelligibility of the LPC vocoders for most test conditions. The 600 bps MELP DRT is within just 3.5 points of the higher bit-rate MELP system. The rate reduction by vector quantization of MELP has not affected the intelligibility of the model noticeably. The DRT scores for HMMWV demonstrate that the noise pre-processor of the MELP vocoders enables better intelligibility in the presence of acoustic noise.

TABLE 4

VOCODER DRT/DAM TESTS

| TEST CONDITION | DRT | DAM |
|---|---|---|
| Source Material (QUIET) | 95.9[1] | 85.8[1] |
| MELPe 2400 (QUIET) | 94.0[1] | 69.1[1] |
| MELPe 600 (QUIET) | 90.5[1] | 54.9[1] |
| LPC10e 2400 (QUIET) | 89.4[1] | 50.0[1] |
| LPC10e 600 (QUIET) | 86.8[1] | 47.1[1] |
| Source Material (HMMWV) | 91.0[2] | 45.0[2] |
| MELPe 2400 (HMMWV) | 74.4[2] | 52.6[2] |
| MELPe 600 (HMMWV) | 65.0[1] | 40.3[1] |
| LPC10e 2400 (HMMWV) | 68.7[1] | 37.6[1] |
| LPC10e 600 (HMMWV) | 61.9[1] | 35.3[1] |

The DAM performance of the MELP model demonstrates the strength of the new speech model. MELP's speech acceptability at 600 bps is more than 4.9 points better than LPC10e 2400 in the quiet test condition, which is the most noticeable difference between both vocoders. Speaker recognition of MELP 2400 is much better than LPC10e 2400. MELP based vocoders have significantly less synthetic sounding voice with much less buzz. Audio of MELP is perceived to being brighter and having more low-end and high-end energy as compared to LPC10e.

Secure voice availability is directly related to the bit-error rate performance of the waveform used to transfer the vocoder's data and the tolerance of the vocoder to bit-errors. A 1% bit-error rate causes both MELP and LPC based coders to degrade voice intelligibility and quality as seen in the example of table 5. The useful range therefore is below approximately a 3% bit-error rate for MELP and 1% for LPC based vocoders.

Figure 6:
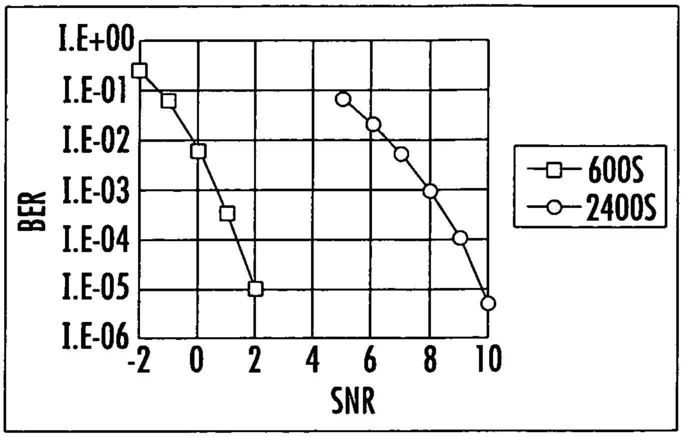
FIG. 6 is a graph showing the comparison of the bit-rate relative to the signal-to-noise ratio for 600 bps waveform over the 2400 bps standard.
Figure 7:
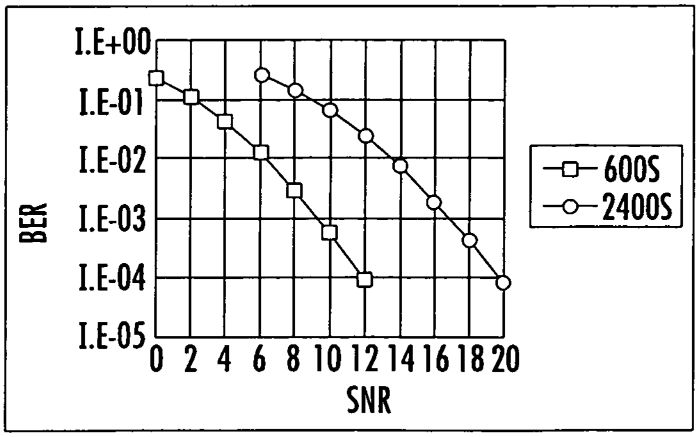
FIG. 7 is another graph similar to FIG. 6 with the CCIR being poor.

The 1% bit-error rate of the MIL-STD-188-110B waveforms can be seen for both a Gaussian and CCIR Poor channel in the graphs shown in FIGS. 6 and 7, respectively. The curves indicate a gain of approximately seven dB can be achieved by using the 600 bps waveform over the 2400 bps standard. It is in this lower region in SNR that allows HF links to be functional for a longer portion of the day. In fact, many 2400 bps links cannot function below a 1% bit-error rate at any time during the day based on propagation and power levels. Typical ManPack Radios using 10-20 W power levels make the choice in vocoder rate even more mission critical.

TABLE 5

BER 1% DRT/DAM TESTS

| TEST CONDITION | DRT | DAM |
|---|---|---|
| MELPe 2400 | 91.5[1] | 54.7[2] |
| MELPe 600 | 85.2[1] | 43.1[1] |
| LCP10e 2400 | 81.4[2] | N/A |
| LPC10e 600 | 79.5[1] | 38.3[1] |

The MELP vocoder in accordance with one non-limiting example can run real-time such as on a sixteen bit fixed-point Texas Instrument's TMS320VC5416 digital signal processor. The low-power hardware design can reside in the Harris RF-5800H/PRC-150 ManPack Radio and can be responsible for running several voice coders and a variety of data related interfaces and protocols. The DSP hardware design could run the on-chip core at 150 MHz (zero wait-state) while the off-chip accesses can be limited to 50 MHz (two wait-state) in these non-limiting examples. The data memory architecture can have 64K zero wait-state, on chip memory and 256K of two wait-state external memory which is paged in 32K banks. For program memory, the system can have an additional 64K zero wait-state, on-chip memory and 256K of external memory that can be fully addressed by the DSP.

An example of the 2400 bps MELP source code could include Texas Instrument's 54X assembly language source code combined with a MELP 600 vocoder manufactured by Harris Corporation. This code in one non-limiting example had been modified to run on the TMS320VC5416 architecture using a FAR CALLING run-time environment, which allows DSP programs to span more than 64K. The code has been integrated into a C calling environment using TI's C initialize mechanism to initialize MELP's variables and combined with a Harris proprietary DSP operating system.

Run-time loading on the MELP 2400 target system allows for Analysis to run at 24.4% loaded, the Noise Pre-Processor is 12.44% loaded, and Synthesis to run at 8.88% loaded. Very little load increase occurs as part of MELP 600 Synthesis since the process is no more than a table lookup. The additional cycles the for MELP 600 vocoder are contained in the vector quantization of the spectrum analysis.

The speech quality of the new MIL-STD-3005 vocoder is better than the older FED-STD-1015 vocoder. Vector quantization techniques can be used on the new standard vocoder combined with the use of the 600 bps waveform as is defined in U.S. MIL-STD-188-110B. The results seem to indicate that a 5-7 dB improvement in HF performance can be possible on some fading channels. Furthermore, the speech quality of the 600 bps vocoder is typically better than the existing 2400 bps LPC10e standard for several test conditions. Further on-air testing will be required to validate the presented simulation results. If the on-air tests confirm the results, low-rate coding of MELP could be used with the MIL-STD-3005 for improved communication and extended availability to ManPack radios on difficult HF links.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of transcoding Mixed Excitation Linear Prediction (MELP) encoded speech data, which comprises:

quantizing MELP parameters for a block of voice data into quantized MELP parameters;

encoding within an encoder circuit the quantized MELP parameters into a serial bit stream of encoded data having a first bit rate;

converting the encoded data into MELP parameters;

decoding the MELP parameters;

buffering the decoded MELP parameters;

generating perceptual inverse power spectrum weights using coefficients derived from line spectral frequencies and from the decoded MELP parameters;

time interpolating the MELP parameters from frames of speech data using the inverse power spectrum weights;

updating interpolation values as new MELP parameters if the number of speech frames exceeds a predetermined number and interpolating the new MELP parameters and iterating over the new MELP parameters; and encoding the interpolated data as a block of bits corresponding to frames of speech data and iterating to generate output speech samples having a second bit rate that is a multiple of the first bit rate, wherein the first and second bit rates are not the same.

2. The method according to claim 1, which further comprises quantizing MELP parameters for a block of voice data from unquantized MELP parameters of a plurality of successive frames within a block.

3. A method according to claim 1, wherein the step of performing an encoding function comprises obtaining unquantized MELP parameters and combining frames to form one MELP 600 bps frame, creating unquantized MELP parameters, quantizing the MELP parameters of the MELP 600 bps frame, and encoding them into a serial data stream.

4. A method according to claim 1, which further comprises buffering the MELP parameters using one frame of delay.

5. A method according to claim 1, which further comprises performing a MELP 600 encoding analysis.

6. A method according to claim 1, which further comprises reducing the bit-rate by a factor of four.

7. A method of transcoding Mixed Excitation Linear Prediction (MELP) encoded speech data, which comprises:

quantizing MELP parameters for a block of voice data into quantized MELP parameters;

encoding within an encoder circuit the quantized MELP parameters into a serial bit stream of encoded data having a first bit rate;

converting the encoded data into MELP parameters;

decoding the MELP parameters;

determining the number of "n" ms speech frames;

interpolating MELP speech parameters for an "n" ms speech frame and obtaining new interpolated line spectral frequencies and MELP parameters;

buffering interpolated MELP parameters;

generating perceptual inverse power spectrum weights using new interpolated line spectral frequencies and updating interpolation values as new MELP parameters if the number of speech frames exceeds a predetermined number and interpolating the new MELP parameters and iterating over new MELP parameters;

encoding the interpolated MELP parameters and inverse power spectrum weights and iterating by interpolating, buffering, generating and encoding on new "n" ms speech frames when more "n" ms speech frames exist; and generating output speech samples having a second bit rate that is a multiple of the first bit rate, wherein the first and second bit rates are not the same.

8. A method according to claim 7, which further comprises buffering interpolated parameters at about one frame.

9. A method according to claim 7, which further comprises increasing the bit-rate by a factor of four.

10. A transcoder that transcodes Mixed Excitation Linear Prediction (MELP) speech data comprising:

a circuit configured to quantize MELP parameters for a block of voice data into quantized MELP parameters;

an encoder circuit configured to encode the quantized MELP parameters into a serial bit stream of encoded data having a first bit rate;

a decoder circuit configured to receive and convert the encoded data into MELP parameters used by the first MELP vocoder and decode the MELP parameters;

a conversion unit that generates perceptual inverse power spectrum weights using coefficients derived from line spectral frequencies and from the decoded MELP parameters and which buffers the decoded MELP parameters and time interpolates the MELP parameters from frames of speech data using the inverse power spectrum weights, wherein said conversion unit is configured to update interpolation values as new MELP parameters if the number of speech frames exceeds a predetermined number and to interpolate the new MELP parameters and iterate over new MELP parameters; and an encoder circuit that encodes the interpolated data as a block of bits corresponding to frames of speech data and iterates to change the bit-rate and generate output speech samples having a second bit rate that is a multiple of the first bit rate, wherein the first and second bit rates are not the same.

11. A transcoder according to claim 10, wherein said encoder circuit quantizes MELP parameters for a block of voice data from unquantized MELP parameters of a plurality of successive frames within a block.

12. The transcoder according to claim 10, wherein said encoder circuit obtains unquantized MELP parameters, combining frames to form a MELP 600 bps frame, creating unquantized MELP parameters, quantizing the MELP parameters of the MELP 600 bps frame, and encoding them into a serial data stream.

13. A transcoder that transcodes Mixed Excitation Linear Prediction (MELP) encoded speech data comprising:

a circuit configured to quantize MELP parameters for a block of voice data into quantized MELP parameters;

an encoder circuit configured to encode the quantized MELP parameters into a serial bit stream of encoded data having a first bit rate;

a decoder circuit configured to receive and convert the encoded data into MELP parameters;

a conversion unit that determines the number of "n" ms speech frames and interpolates the MELP speech parameters for an "n" ms speech frame, obtains new interpolated line spectral frequencies and MELP parameters and buffers interpolated MELP parameters and generates perceptual inverse power spectrum weights using the new interpolated line spectral frequencies, wherein said conversion unit is configured to update interpolation values as new MELP parameters if the number of speech frames exceeds a predetermined number and to interpolate the new MELP parameters and iterate over new MELP parameters; and an encoder circuit that encodes on the interpolated MELP parameters and inverse power spectrum weights wherein said conversion unit is configured to iterate over new "n" ms speech frames and interpolate, buffer, generate weights and encode over new "n" ms speech frames when new "n" ms speech frames exist to generate output speech samples having a second bit rate that is a multiple of the first bit rate, wherein the first and second bit rates are not the same.

14. The transcoder according to claim 13, wherein said conversion unit buffers interpolated parameters at about one frame.

15. The transcoder according to claim 13, wherein MELP 600 encoded data is transcoded up to MELP 2400 encoded data.

* * * * *